M. D. McDOUGALL.
AUTOMATIC WATERING TROUGH.
APPLICATION FILED JULY 8, 1910.
975,554.
Patented Nov. 15, 1910.
2 SHEETS—SHEET 1.
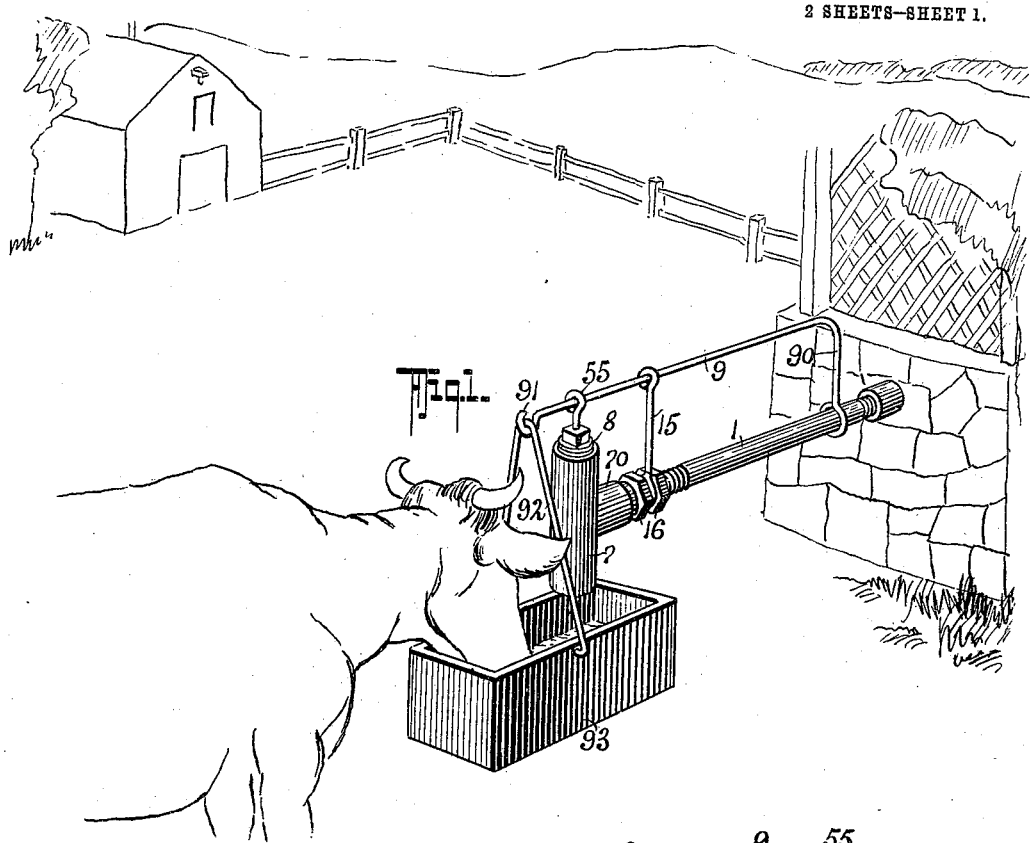
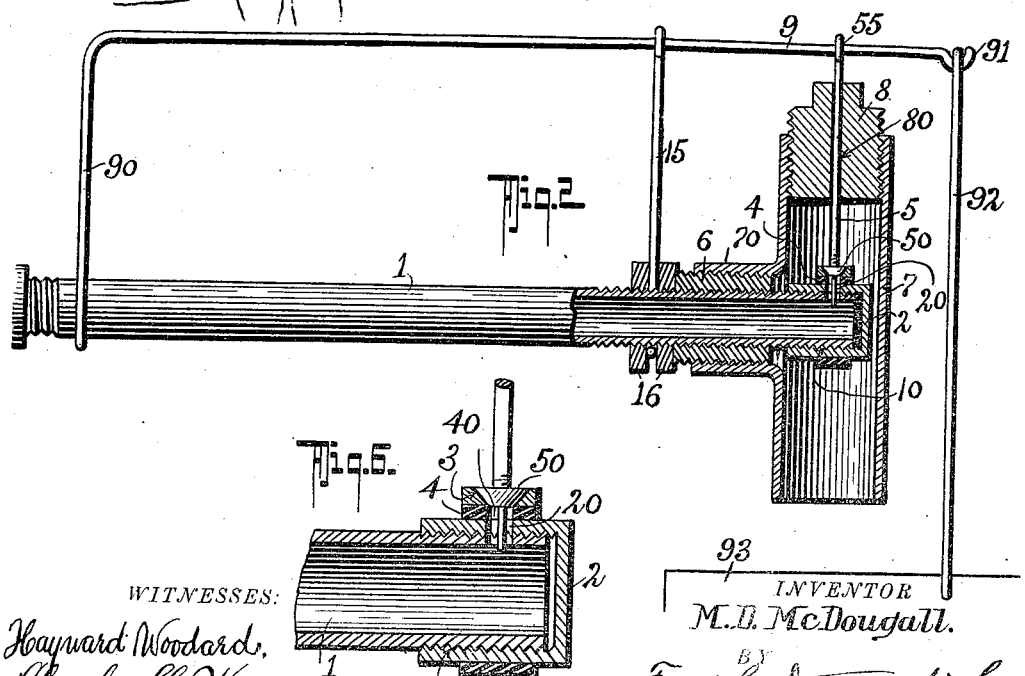
WITNESSES:
Hayward Woodard.
Charles H. Wagner
INVENTOR
M. D. McDougall.
BY
Fred J. Dieterich & Co.
ATTORNEYS

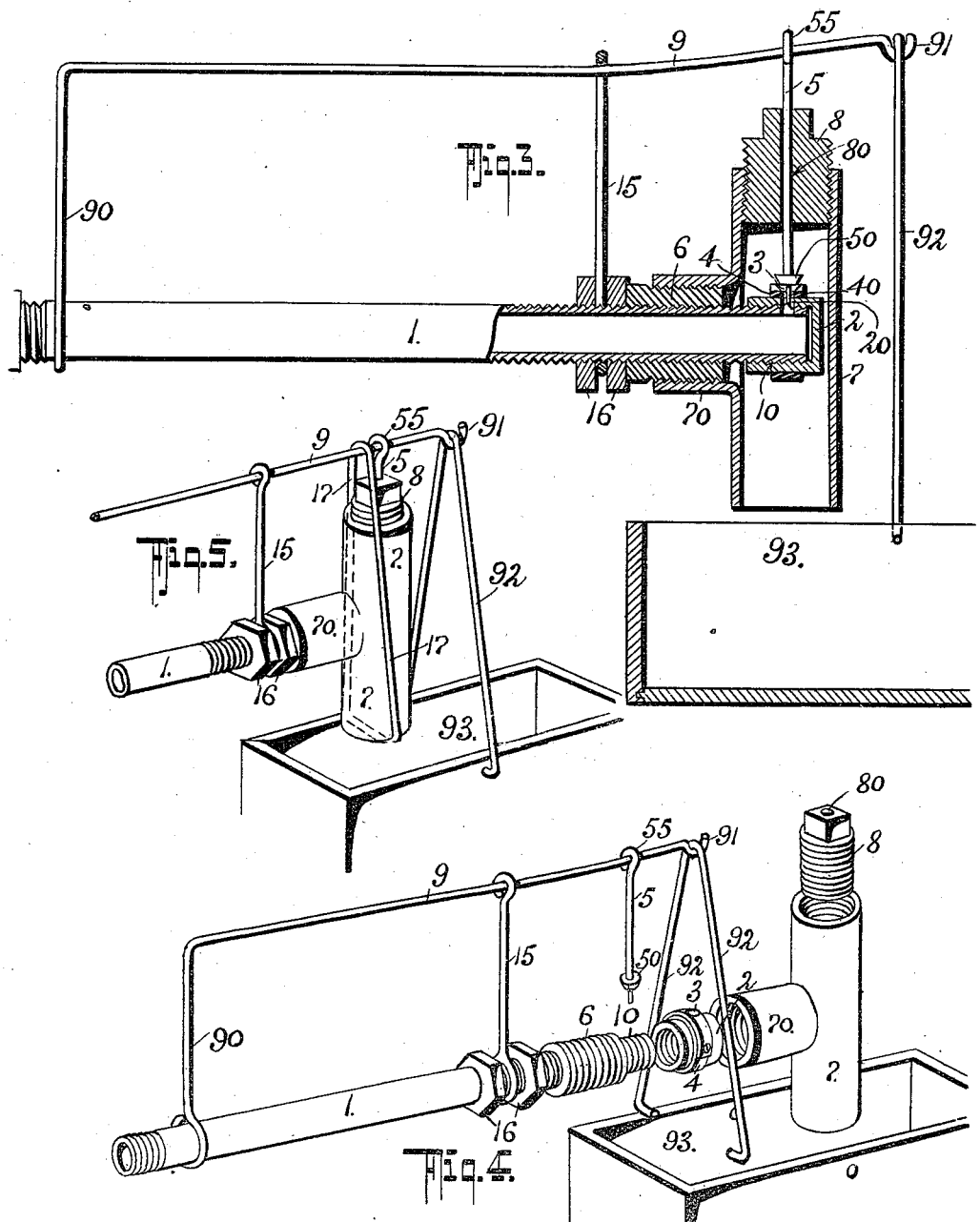

UNITED STATES PATENT OFFICE.

MOORE D. McDOUGALL, OF WATSONVILLE, CALIFORNIA.

AUTOMATIC WATERING-TROUGH.

975,554.

Specification of Letters Patent. Patented Nov. 15, 1910.

Application filed July 8, 1910. Serial No. 571,047.

*To all whom it may concern:*

Be it known that I, MOORE D. MCDOUGALL, residing at Watsonville, in the county of Santa Cruz and State of California, have invented a new and Improved Automatic Watering-Trough, of which the following is a specification.

This invention relates to that type of watering troughs or fountains in which the supply is automatically cut off by the weight of the trough, and in which the feed valve automatically opens and feeds to the trough after the predetermined or valve closing weight thereof is reduced.

My invention, while readily adapted for watering stock, is more particularly intended for watering poultry, the valve mechanism being especially designed for releasing the water in drops or very small quantities.

My invention primarily has for its object to provide a watering means of the character stated, of a very simple and economical construction, that can be easily set up for use, and which cannot readily get out of order, and the said invention consists in certain details of structure and peculiar combination of parts, all of which will be hereinafter fully explained, specifically pointed out in the appended claims and illustrated in the accompanying drawings, in which:

Figure 1, is a perspective view of my improved construction of watering trough. Fig. 2, is a vertical, longitudinal section thereof, the valve being shown as held closed by the water loaded trough. Fig. 3, is a similar view, the valve being to its released or open position. Fig. 4, shows the several parts that constitute my invention as separated. Fig. 5, is a detail perspective view of the front end of the watering device and shows the hook or clamp for holding the valve closed when the trough is removed or being cleaned.

In the practical arrangement, my invention embodies attachments especially adapted or designed for being removably connected to the end of a water delivery spout or pipe section 1, the outer or discharging end of which is externally threaded as indicated by 10.

2 designates a cap that is internally threaded to fit over and close the discharge end of the pipe 1, and the said cap has a small discharging orifice 20 over which is mounted a valve seat 3, that is tightly held on a rubber washer 4 also apertured as at 40 for the passage of the valve stem 5, movable through the apertures 20 and 40 and having a valve head 50 for engaging the seat 3, as is clearly shown in Fig. 3.

6 designates a bushing that threads onto the pipe 1 and it is externally threaded to receive the lateral internally threaded extension 70 of a T-shaped housing 7, in one end of which is threaded a plug 8 vertically apertured as at 80 for guiding the valve stem 5 that passes through it. The upper end of the valve stem has an eye portion 55 for hanging on a wire spring sustaining arm 9 that extends parallel with the pipe 1 and is bent down at right angles to form a supporting member 90 for connecting with and being supported by the pipe 1 and the outer or front end of the said tension spring 9 terminates in a hook 91 for receiving the hanging bail 92 that supports the watering trough 93, it being obvious from the drawing that when the trough is full, the tension of spring 9 is overcome and the valve stem 5 is pulled down to hold the valve 50 closed against the valve seat to cut off the supply, and when the water is used from the trough to that extent that the tension of spring 9 lifts the trough the stem 5 is raised and the water feeds through the small discharge outlet in the cap until the trough is again filled to the desired weight to close the valve. To regulate the tension of the arm 9, a slide member 15 engages the said arm and is mounted to slide on the pipe 1, it being held against the bushing 6 by a jam nut 16.

When it is desired to clean or remove the tank, the valve stem is held down by a hook member 17 that is hung on the arm 9 and has a finger portion for being swung under the lower end of the T-shaped housing.

From the foregoing, taken in connection with the drawings, the advantages and the manner of adjustment of my invention will be readily apparent. The parts are coöperatively so arranged that their construction is simple, inexpensive to manufacture and of compact form, so they may be readily transported without danger of being broken or disarranged.

Having thus described my invention, what I claim is:

1. In an apparatus of the character stated, the combination with a water supply pipe, and a closure for the discharge end having a discharging orifice and a valve seat surrounding the said orifice; of a valve for coöperating with the seat, a spring arm disposed in a plane parallel with the pipe, a tension regulator mounted on the pipe that engages the spring arm, a stem for the valve connected to and movable with the spring arm and a water collecting trough suspended from the spring arm.

2. An apparatus of the character stated, comprising a casing attachable to the discharge end of a water delivering pipe, a closure cap within the casing for fitting over the discharge end of the water pipe, said cap having a valve seat, and a discharge through the seat, a trough into which the casing discharges, a valve for coöperating with the seat and the water feed, a tension device mounted on the pipe, and a hanger that connects with the said tension device, the stem of the controlling valve being connected to and movable with the tension device, for the purposes stated.

3. In an apparatus of the character stated, the combination with a water supply pipe, a closure cap removably mounted on the discharge end of the pipe and having a discharge orifice with a surrounding valve seat, a T-shaped casing removably mounted on the pipe to inclose the capped end, an apertured plug in one end of the casing, a valve stem guided through said plug having a valve for coöperating with the valve seat in the cap member, a spring arm disposed in a plane parallel with the pipe and supported by the pipe, a connection for coupling the valve stem and the said arm, a water receiving trough and a supporting bail for the trough that hangs from the spring arm.

4. In an apparatus of the character stated, the combination with a water supply pipe, a closure cap removably mounted on the discharge end of the pipe and having a discharge orifice with a surrounding valve seat, a T-shaped casing removably mounted on the pipe to inclose the capped end, an apertured plug in one end of the casing, a valve stem guided through said plug having a valve for coöperating with the valve seat in the cap member, a spring arm disposed in a plane parallel with the pipe and supported by the pipe, a connection for coupling the valve stem and the said arm, a water receiving trough and a supporting bail for the trough that hangs from the spring arm, and a tension regulator adjustably mounted on the service pipe and connected with the spring arm for increasing or diminishing its tension.

MOORE D. McDOUGALL.

Witnesses:
H. S. FLETCHER,
W. L. MILLER.